Jan. 12, 1965 E. E. HEWITT 3,165,119
FOUR-WAY VALVE DEVICE
Filed July 30, 1962 3 Sheets-Sheet 1

INVENTOR.
ELLIS E. HEWITT
BY
*A. A. Steinmiller*
ATTORNEY

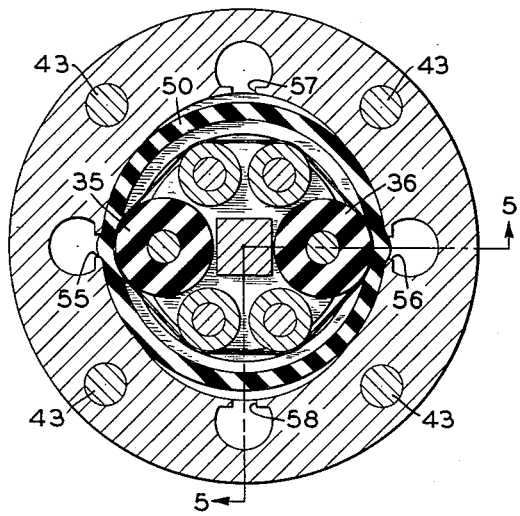
Fig-4
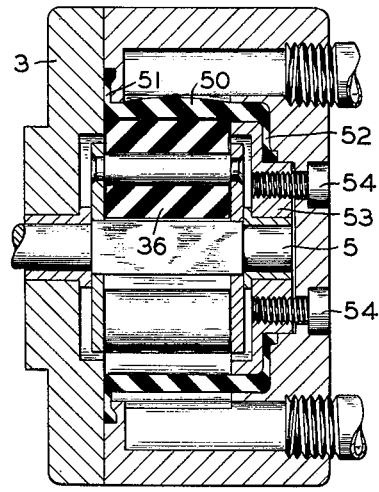
Fig-5
Fig-6
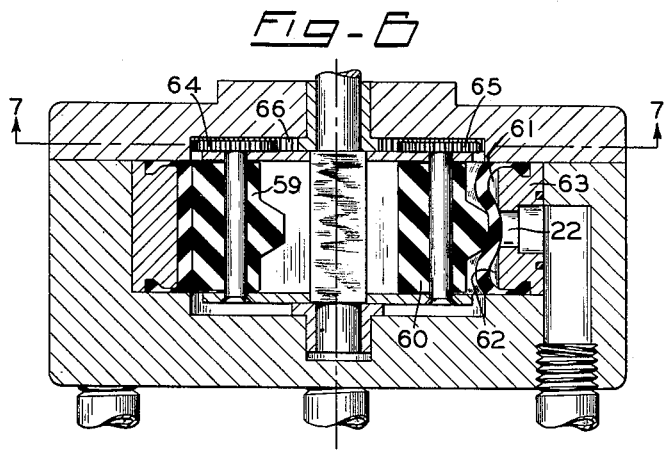
INVENTOR.
ELLIS E. HEWITT
BY
*A. A. Steinmiller*
ATTORNEY INVENTOR.
ELLIS E. HEWITT
BY
A. A. Steinmiller
ATTORNEY

United States Patent Office 3,165,119
Patented Jan. 12, 1965

3,165,119
FOUR-WAY VALVE DEVICE
Ellis E. Hewitt, Ruffsdale, Pa., assignor to Westinghouse Air Brake Company, Wilmerding, Pa., a corporation of Pennsylvania
Filed July 30, 1962, Ser. No. 213,275
6 Claims. (Cl. 137—625.21)

This invention relates to a new and improved valve device and more particularly to a rotary valve device of the type manually operated to selectively control fluid pressure communications between a plurality of separate ports.

Conventional rotary valves utilize a lap fit sliding seal with metal-to-metal contact requiring constant lubricating procedures to reduce the metal-to-metal wear on the valve seats. The new and improved valve device disclosed herein has no metal-to-metal wearing surfaces and the moving parts of the valve are never in contact with the fluid media controlled thereby.

According to the present invention, there is provided a new and improved rotary valve device of low manufacturing cost in which a cylindrical rolling seal is forced against the inside diametrical surface of a cylindrical bushing by a plurality of rollers to thereby control communication between ports provided in the bushing.

In the accompanying drawings, FIG. 1 is an outline view of the rotary valve shown diagrammatically as connected to a supply reservoir and an operating device, illustrated as a power cylinder.

FIG. 4 is a diagrammatic sectional view of a second embodiment of the rotary valve device of FIG. 1, taken on sectional line 2—2.

FIG. 5 is a diagrammatic sectional view of the embodiment of the rotary valve device shown in FIG. 4, taken on sectional line 5—5 with the horizontal section rotated 90° and shown in the plane of the vertical section.

FIG. 6 is a diagrammatic sectional view of a third embodiment of the rotary valve device of FIG. 1, the portion to the left of the center line showing a modification of a sealing roller in its operating position and the portion to the right of the center line showing a sealing roller in its lap position.

Figure 1:
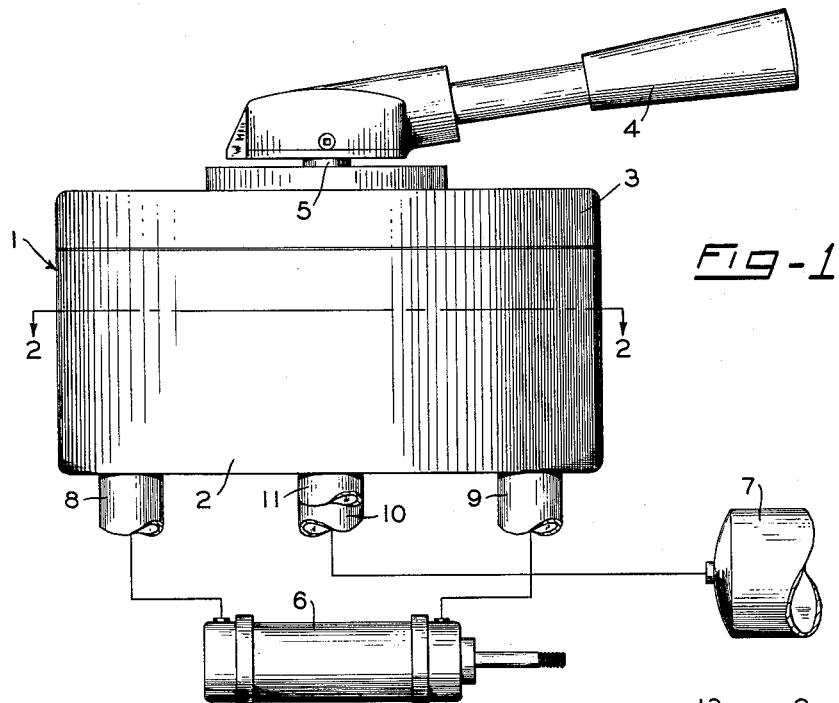
Figure 2:
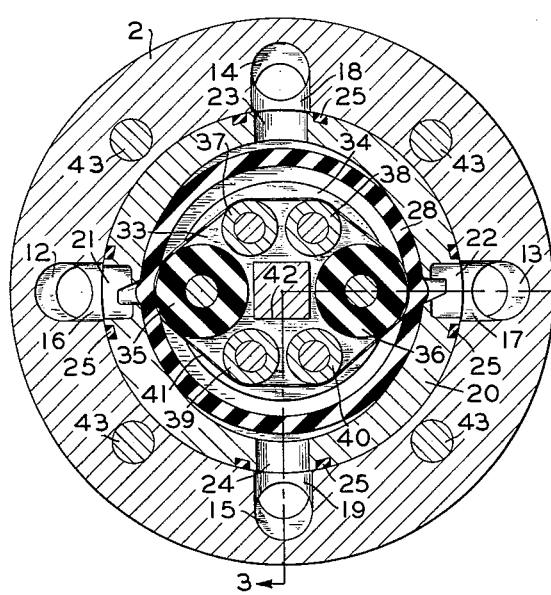
FIG. 2 is a diagrammatic sectional view of the rotary valve device of FIG. 1, taken on the line 2—2.
Figure 3:
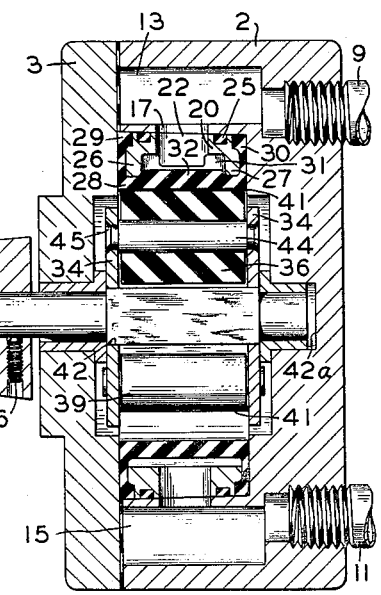
FIG. 3 is a diagrammatic sectional view of the rotary valve device of FIG. 2, taken on section line 3—3, with the horizontal section rotated 90° and shown in the plane of the vertical section.

*Description—FIG. 1, FIG. 2, FIG. 3*

Referring to FIG. 1, there is shown a rotary valve 1 comprised of a valve body 2, a valve cover 3, and a handle 4 connected by a circular shaft 5 to the interior of the valve where said shaft is rectangular as described hereinafter. The rotary valve 1 of FIG. 1 is shown as utilized to control a double-acting cylinder 6 with fluid under pressure supplied from a reservoir 7. The rotary valve 1 selectively controls supply or venting or lapping of fluid under pressure at four pipes 8, 9, 10 and 11, pipes 8 and 9 being connected to operating chambers (not shown) of the double-acting cylinder 6, pipe 10 being connected to the supply reservoir 7, and pipe 11 connected to a sump (not shown) or to atmosphere if desired. Positioning of the handle 4 effects selective control of the supply of fluid under pressure from the reservoir 7 to either end of the double-acting cylinder 6 to operating chambers (not shown) or venting of fluid under pressure therefrom to cause control of the double-acting cylinder to perform any function desired, a description of which function is not necessary to the understanding of the present invention.

The interior of the rotary valve 1 is shown in section in FIG. 2 and FIG. 3, comprising the body 2 having four equally spaced passages 12, 13, 14 and 15 to which the four pipes 8, 9, 10 and 11 are connected respectively at the bottom of said body, the top being closed off by the valve cover 3. The passages are connected to the inside diameter of said body 2 at ports 16, 17, 18 and 19, respectively. A bushing 20 is fitted around the inside diameter of said body and provided with ports 21, 22, 23 and 24 extending therethrough and opening into adjacent passages 16, 17, 18 and 19 respectively in the body 2. Suitable O-ring seals 25 surround each of the ports in the bushing to prevent leakage or communication therebetween. The thickness of the bushing 20 is varied slightly such that the walls thereof are thinner at the ports 23 and 24 adjacent passages 18 and 19 to thereby cause the inside surface of said bushing to be slightly oval in shape. This oval shaped inside surface of the bushing is necessary for assembly purposes as described hereinafter. A cross section of the bushing 20 is C shaped with the outermost flanges 26 and 27 extending inward toward the axis of said bushing as shown in FIG. 3.

A C shaped cylindrical rubber seal 28 (FIG. 3) surrounds the inside surface of the bushing 20 with the outermost flanges 29 and 30 of said seal overlapping the flanges 26 and 27 of the bushing in opposite directions thereof to form a chamber 31 between the bushing and the seal. The flanges 29 and 30 of the seal 28 extend around the bushing 20 to form a seal between the bushing 20 and the body 2 on all sides of the bushing. The center portion 32 of the seal is elastic to permit fluid under pressure in the chamber 31 to deflect the seal inwardly to provide communication between ports 21 and 24, and 22 and 23, in a manner described hereinafter.

Inside the seal 28 is a rolling divider 33 (FIG. 2) comprising a frame 34 having two flanges between which is secured two sealing rollers 35 and 36, and four supporting rollers 37, 38, 39 and 40, the diameter of the sealing rollers being larger than that of the supporting rollers. The sealing rollers 35 and 36 are positioned so as to engage the seal 28 and bias said seal outwardly in a sealing contact with the inner surface of the bushing 20 except at the ports 23 and 24 and the area immediately adjacent said ports where the walls of the bushing are of reduced thickness for simplifying assembly thereof. A protective belt 41 encircles the sealing rollers 35, 36 and is supported by the supporting rollers 37, 38, 39 and 40 to prevent the seal 28 from being caught between the rollers and damaged when the divider 33 is repositioned as explained hereinafter. A rectangular shaftway 42 is opened through the frame 34 for receiving the rectangular portion of shaft 5 connected to the handle 4 in a manner such that rotative repositioning of the handle 4 causes the divider 33 to be rotatively repositioned with the sealing rollers 35 and 36 engagingly repositioning along the inner surface of the seal 28. The circular ends of the shaft 5 are suitably bushed at the valve cover 3 and a recess 42a in the valve body 2.

For assembly purposes there is shown a plurality of bolts 43 for maintaining the valve cover 3 on the body, roller shafts 44 and securing screws 45 for maintaining the various rollers in position, and a set screw 46 for connecting the handle 4 to the shaft 5. During assembly, the divider 33 is positioned with the sealing rollers 35 and 36 opposite the ports 23 and 24 such that they may be placed within the seal 28 where there is expandable clearance between said seal and the bushing 20 to prevent damage to the seal.

*Operation— FIGS. 1, 2 and 3*

As utilized in the sysem of FIG. 1, the pipe 10 establishes communication from the reservoir 7 to the passage 14 and ports 18 and 23. Therefore, the port 23 is referred to hereinafter as the supply port 23. Pipe 11 connected to passage 14 and ports 19 and 24 is also connected to a sump or exhaust. Therefore, the port 24 is referred to hereinafter as the exhaust port 24. Pipes 8 and 9 are connected to opposite ends of the double-acting cylinder 6 where fluid under pressure is selectively delivered. Therefore, port 21 connected to pipe 8 via passage 12 and ports 16, and port 22 connected to pipe 9 via passage 13 and port 17 are respectively referred to hereinafter as the delivery port 21 and delivery port 22.

As shown in FIG. 2, the divider 33 is positioned in a "lap" position wherein the roller 35 forces the seal 28 against the delivery port 21 to lap said port, and the roller 36 forces the seal 28 against the delivery port 22 to lap said port. The supply port 23 is open to supply fluid under pressure between the seal 28 and the inner surface of the bushing 20 immediately adjacent the supply port 23, but is blanked off at the delivery ports 21 and 22 with no means of escaping and merely causes the seal to be forced against the supporting rollers 37 and 38.

Movement of the handle 4 approximately 45° in a clockwise direction is transmitted via the shaft 5 to the divider 33, causing the divider to be rotated clockwise approximately 45° to a "first operating position" with the roller 36 midway between delivery ports 22 and exhaust port 24, and roller 35 midway between delivery port 21 and supply port 23. With the rollers positioned as just described, fluid under pressure from the supply port 23 flows between the seal 28 and the inner surface of the bushing 20 to the delivery port 22 and thence to one end of the double-acting cylinder 6 by way of port 17, passage 13 and pipe 9. Simultaneously with the supply of fluid under pressure to one end of the double-acting cylinder 6, any fluid under pressure in the second end is vented by way of pipe 8, passage 12, port 16, delivery port 21, between the inner surface of the bushing 20 and seal 28 to the exhaust port 24 and thence to atmosphere. With the one end of cylinder 6 supplied with fluid under pressure and a second end connected to atmosphere, the internal elements (not shown) of the cylinder 6 will be moved to a so-called "first" position to perform functions, a knowledge of which is not necessary herein.

Movement of the handle 4 approximately 45° counterclockwise from the just-described "first operating position" will cause the rollers 35 and 36 to move their lap position to seal the delivery ports 21 and 22 and maintain the cylinder 6 lapped in its "first" position.

Movement of the handle 4 approximately 45° counterclockwise from the lap position to a "second operating position" positions the roller 35 midway between delivery port 21 and the exhaust port 24, and the roller 36 midway between the delivery port 22 and supply port 23. With the rollers positioned as just described, fluid under pressure from the supply port 23 flows between the seal 28 and the inner surface of the bushing 20 to the delivery port 21 and thence to the second end of the double-acting cylinder 6, while simultaneously the said "one" end of the cylinder 6 is vented by way of pipe 9, passage 13, port 17, delivery port 22, between the inner surface of the bushing 20 and seal 28 to the exhaust port 24 and thence to atmosphere. With the one end of the cylinder 6 vented to atmosphere and the second end supplied with fluid under pressure, the internal elements (not shown) of the cylinder will be moved oppositely to a so-called "second" position.

It can thus be seen that with handle 4 of the valve in its first operating position, the divider 33 is positioned to permit fluid under pressure flow via delivery port 22 to the cylinder 6 to move the elements of the cylinder 6 to a first position, and with the handle 4 in its second operating position, the divider 33 is positioned to permit fluid under pressure flow via delivery port 21 to the cylinder 6 to move the elements of the cylinder 6 to a second position. With the handle 4 in the lap position, the divider 33 is positioned to lap both delivery ports 21 and 22 and cause the elements of the cylinder 6 to remain in the position to which they are last operated.

*FIGS. 4 and 5*

The rotary valve shown in FIGS. 4 and 5 is a modification of that shown in FIGS. 2 and 3 with all elements thereof being the same with the exceptions discssued hereinafter.

The bushing 20 and the cylindrical C shaped rubber seal 28 of FIGS. 2 and 3 have been eliminated and replaced by a cylindrical Z shaped rubber seal 50 in the modification of FIGS. 4 and 5. The Z shaped rubber seal as shown in FIG. 5 has one leg 51 thereof extending outwardly and maintained securely in place between the valve cover 3 and the valve body 2 by the bolts 43 in the valve body, and the other leg 52 extending inwardly and secured against the body 2 by a bushing 53 which is maintained in place by bolts 54. The bushing 53 also serves as a support for the cylindrical end of the shaft 5. The Z shaped seal in this modification is maintained in sealing contact with the inside surface of the valve body 2 by the sealing rollers 35 and 36 in lap position for sealing delivery ports 55 and 56 as desired, said ports corresponding to the like delivery ports 21 and 22 of FIG. 2. Supply port 57 and exhaust port 58 are connected to the delivery ports 55 and 56 in a manner of operation exactly like that of the operation of the rotary valve of FIGS. 2 and 3 with corresponding supply, exhaust and delivery ports.

Figure 7:
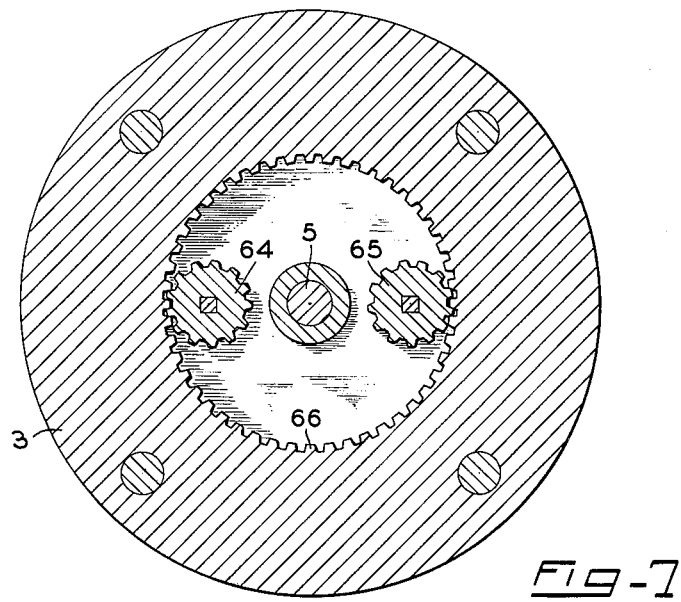
FIG. 7 is a diagrammatic sectional view of the rotary valve device of FIG. 6, taken on sectional line 7—7.

FIG. 6 and FIG. 7 show an additional modification of the rotary valve of FIGS. 1, 2 and 3 with all elements thereof being similar with the exceptions described hereinafter.

The right-hand half of the section shown in FIG. 6 illustrates one of the sealing rollers in a lap position at a delivery port; the left-hand half illustrates one of the sealing rollers in an operating position midway between a delivery port and either the exhaust port or supply port.

The rubber seal 28 of FIGS. 2 and 3 is exactly like that of FIGS. 6 and 7, but the bushing against which said seal seats is of different shape due to a different type of roller engaging the seal as described hereinafter. The sealing rollers 59 and 60 of FIG. 6 are designed for use with a liquid fluid. The sealing surface of the rollers 59 and 60 are recessed on one side adjacent the ends of the rollers with the central portion maintained at the original diameter immediately adjacent the portion of said rollers which engage the seal 28 and forces same against the delivery ports 21 and 22. This is illustrated in the showing of roller 60 in the right-hand portion of FIG. 6 in its lap position where the recesses in one side of said roller permit two passages 61 and 62 around the sealed delivery port 22. The remaining surface of the sealing rollers 59 and 60 on the opposite side is not recessed so as to force the entire area of the seal 28 against the bushing 63 when the rollers are in their respective first or second operating positions midway between a delivery port and either the supply or exhaust ports, as is illustrated in the showing of roller 59 in the left-hand portion of FIG. 6. The recessed rollers 59 and 60 necessitate the removal of flanges 26 and 27 on the bushing 20 of FIG. 3 such that the bushing is shaped as the bushing 63 of FIG. 6 to provide a complete seal when the rollers 59 and 60 are in their respective operating positions. The recessed construction of the rollers 59 and 60 permits the rollers to seal off the delivery ports 21 and 22 in lap position while permitting a flow of fluid under pressure from the supply port (not shown) past the lapped delivery ports via the passages 61 and 62 to the exhaust port leading in this modification to fluid sumps (not shown) and thereby permit continued operation of pumps (not shown) supplying fluid under pressure thereto without forcing the pump to operate against a high pressure build-up. In order to insure positive positioning of the rollers 59 and 60 such that the recessed portion thereof meets the seal 28 only when the rollers are adjacent the delivery ports, a gear drive of said rollers is provided. The gear drive of FIGS. 6 and 7 is shown as an epicyclic gear train including two small gear wheels 64 and 65 secured to the top of the respective roller shafts 44 of a diameter and tooth design to mesh with a ring gear 66 cast in the valve cover 3, as shown in FIGS. 6 and 7. Another epicyclic type of gear drive is shown in FIG. 8 with a central gear wheel 67 attached to the shaft 5 to mesh with the gear wheels 64 and 65.

Figure 8:
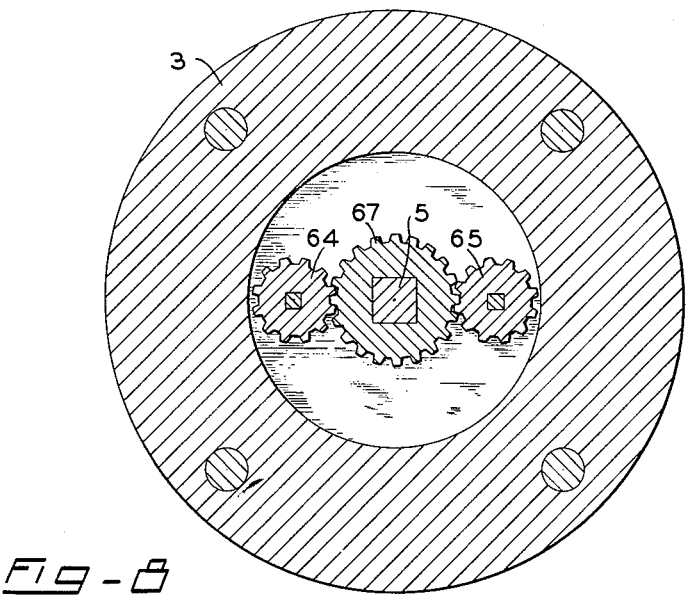
FIG. 8 is a diagrammatic sectional view of another embodiment of the rotary valve device of FIG. 6, taken on a sectional line similar to that of 7—7 utilizing a different gear arrangement.

Operation of the modification shown in FIGS. 6, 7 and 8 is exactly the same as that described in connection with the rotary valve of FIGS. 2 and 3, and is, therefore, not repeated herein.

Although the rotary valve shown and described herein is of the four-way type, it can be seen that increasing or decreasing the number of ports and sealing rollers can modify this rotary valve to provide for two-way, five-way or six-way systems as desired.

Having now described the invention, what I claim as new and desire to secure by Letters Patent is:

1. A rotary valve device comprising:
   (a) a valve body having an internal circular bore and a supply passage, an exhaust passage and a first and second delivery passage opening thereinto in spaced angular relationship,
   (b) expandable annular sealing means positioned within said bore adjacent the inner surface of said bore,
   (c) cover means securing said sealing means on the outer edges of said inner surface of said bore in a sealing manner,
   (d) a plurality of roller means coaxially located within said annular sealing means and engaging said sealing means in a rolling manner to bias said sealing means into sealing contact with the inside surface of said bore at the point of engagement of said roller means with said sealing means,
   (e) divider means securing said plurality of roller means in a definite spaced relationship with each other, and
   (f) positioning means operably connected to said divider means for selectively rotatably positioning said roller means in engagement with said sealing means in one position to establish a first communication between said supply passage and said first delivery passage, and a second communication between said second delivery passage and said exhaust passage, and in a second position to establish a third communication between said supply passage and said second delivery passage and a fourth communication between said first delivery passage and said exhaust passage, and in a third position to prevent any communication through either said first or second delivery passages.

2. A rotary valve device as described in claim 1, further characterized by a common gear means and a plurality of gear wheels secured to each of said plurality of roller means, said gear wheels each engaging said common gears means to form an epicyclic gear train operatively responsively to rotation of said positioning means to insure synchronization of rotation of said roller means.

3. A rotary valve device as described in claim 2, further characterized by said roller means each having a recessed portion thereof whereby a fifth communication is established between said supply passage and said exhaust passage at an opening established between said bore and said sealing means at said recessed portion while said positioning means is in said third position.

4. A rotary valve device as described in claim 2, further characterized by said roller means each being recessed adjacent opposite ends thereby to provide communication past said rollers from said supply passage to said exhaust passage at an opening established between said bore and said sealing means at the said recessed portion while said positioning means is in said third position.

5. A rotary valve device as described in claim 1, further characterized by a gear means formed on the inside surface of said cover means and a plurality of gear wheels secured to each of said plurality of roller means, said gear wheels each engaging said gear means during rotation of said roller means to insure synchronization of rotation of each of said roller means.

6. A rotary valve device as described in claim 1, further characterized by a gear means operably connected to said positioning means and a plurality of gear wheels secured to each of said plurality of roller means, said gear means engaging each of said gear wheels during rotation of said positioning means to insure synchronization of rotation of each of said roller means.

References Cited in the file of this patent

UNITED STATES PATENTS

| | | |
|---|---|---|
| 2,534,577 | Courtot | Dec. 19, 1950 |
| 2,880,756 | Puls | Apr. 7, 1959 |
| 2,961,006 | Musser | Nov. 22, 1960 |

FOREIGN PATENTS

| | | |
|---|---|---|
| 713,999 | Great Britain | Aug. 18, 1954 |